Patented July 25, 1950

2,516,317

UNITED STATES PATENT OFFICE 2,516,317

FURFURALDEHYDE-ACETONYL ACETONE REACTION PRODUCT AND METHOD

Mortimer T. Harvey, South Orange, N. J., and Solomon Caplan, New York, N. Y., assignors to Harvel Research Corporation, a corporation of New Jersey No Drawing. Application May 26, 1949, Serial No. 95,568

3 Claims. (Cl. 260—64)

This invention relates to novel organic condensation reaction products and to methods for preparing the same. In its more specific aspect the invention is directed to resinous organic condensation reaction products of acetonyl acetone and furfuraldehyde and to methods for preparing the same. The present application is a continuation in part of our copending application Ser. No. 560,358, filed October 25, 1944, now abandoned, which in turn is a continuation-in-part of our application Ser. No. 461,202 filed October 7, 1942, now Patent Number 2,363,829.

In the course of our experimentations with furfuraldehyde we have discovered that furfuraldehyde may be reacted with acetonyl acetone under alkaline conditions to produce novel resinous condensation reaction products which are insoluble in water, have high boiling points, may be employed as plasticizers for solid resins such as polyvinyl chloride, polyvinyl acetate, copolymers of vinyl chloride and vinyl acetate and the like. They may also be reacted with an aldehyde such as formaldehyde under acidic conditions to produce thermosetting resins; they may be polymerized under acid conditions and they may be employed in combination with the well known phenol-formaldehyde resins to impart high alkali resistance thereto.

According to this invention acetonyl acetone (hexandione 2,5) is reacted with furfuraldehyde under alkaline conditions to produce resinous products capable of being reacted under acidic conditions with formaldehyde to form thermosetting resins. In the practice of the invention there is formed a mixture of acetonyl acetone and furfuraldehyde. The pH of this mixture is adjusted by the addition of any suitable alkali such as sodium hydroxide, potassium hydroxide or the like in such proportion that the pH of the mixture is raised above 7 and preferably between about 8.5 and 14. While the ratio by moles of the acetonyl acetone to the furfuraldehyde in said mixture may vary over wide limits, for plant operation it is preferable that it be between about 1 to 1 and 1 to 8, and for most purposes 1 to 3, to 1 to 8. We have discovered that by varying the mole ratio as above set forth, that under a given procedure we may produce resinous organic condensation reaction products varying from hard brittle masses to readily pourable liquids each of which is capable of reacting with formaldehyde under acidic conditions for the production of thermosetting resins. In the general practice of this invention we prefer to employ a mixture of furfuraldehyde, acetonyl acetone and alkali in sufficient quantity so that the pH of the mixture is between 8.5 and 14. This so adjusted mixture may be placed under a reflux condenser. We have found that upon the addition of the alkali to the furfuraldehyde and acetonyl acetone mixture, an exothermic reaction sets in substantially immediately. This exothermic reaction is allowed to continue and after it has subsided we prefer to heat the mass to boiling and we prefer to maintain it in this state of boiling under said reflux condenser in order to assure completeness of reaction and to assure good yields of resinous material which measures at least 25% of the organic reaction mass and has a viscosity of at least 1000 centipoises at 25° C.

The invention accordingly comprises the several steps and the relation of one or more of such steps with respect to each of the others, and compositions of matter produced thereby, all of which will be exemplified in the following detailed disclosure, and the scope of the invention will be indicated in the claims.

For a fuller understanding of the invention, reference should be had to the following examples which are given to illustrate further the invention and are not to be construed in a limiting sense, all parts being given by weight, unless otherwise indicated.

*Example 1.—1 mole of furfuraldehyde, 1 mole of acetonyl acetone*

96 grams of furfuraldehyde, 114 grams of acetonyl acetone and a solution of one gram of sodium hydroxide in 2 grams of water were mixed together and placed under a reflux condenser. An extremely vigorous exothermic reaction set in immediately after the addition of the sodium hydroxide. After the exothermic reaction had subsided heat was then applied and the mass was kept at refluxing or boiling temperature for one hour resulting in the production of an extremely viscous resinous mass which is one of the novel reaction products of this invention. This extremely viscous resinous mass may then be neutralized with dilute sulphuric acid. This resinous viscous mass may be heated on either the acid or alkaline side to convert it to the solid state. It also may be reacted with formaldehyde in the following manner: 80 grams of 37½% aqueous formaldehyde solution and 4 grams of lactic acid (80%) were added to said viscous mass and the reaction mixture was heated under a reflux condenser at refluxing temperature for 45 minutes. The upper, aqueous layer was then poured off, leaving a plastic or resinous mass that was almost solid but fusible. A sample of this plastic resinous mass gelled in 5 minutes when heated in an oven at 120° C.

*Example 2.—1 mole furfuraldehyde, ¼ mole of acetonyl acetone*

96 grams of furfuraldehyde, 28 grams of acetonyl acetone and a solution of 1 gram of sodium hydroxide in 2 grams of water were mixed together and placed under a reflux condenser. A vigorous exothermic reaction took place. After the exothermic action had subsided, heat was applied and the reaction mass was heated at refluxing or boiling temperature for one hour to provide a liquid resinous product which was then neutralized with dilute sulphuric acid. The so-neutralized novel liquid resinous reaction product may be reacted with an aldehyde such as formaldehyde in the following manner: 80 grams of 37½% aqueous formaldehyde solution and 4 grams of lactic acid (80%) were added and the mixture heated under a reflux condenser at refluxing temperature for 2½ hours. An extremely viscous mass was formed from which the upper aqueous layer was easily decanted. The remaining mass was a fusible resin. A sample of this resin, without dehydration, gelled when placed in an oven for 20 minutes at 120° C.

*Example 3.—1 mole furfuraldehyde, ⅛ mole of acetonyl acetone*

96 grams of furfuraldehyde, 14 grams of acetonyl acetone and a solution of 1 gram of sodium hydroxide in 2 grams of water were mixed together and heated under a reflux condenser at refluxing or boiling temperature for 1 hour. The resultant novel liquid resinous reaction product was then neutralized with dilute sulphuric acid and 80 grams of 37½% aqueous formaldehyde solution and 4 grams of lactic acid (80%) were added thereto. The mixture was heated under a reflux condenser at refluxing temperature for 2 hours at the end of which time the mixture gelled.

*Example 4.—1 mole of furfuraldehyde, ⅛ mole of acetonyl acetone*

96 grams of furfuraldehyde, 14 grams of acetonyl acetone and a solution of 1 gram of sodium hydroxide in 2 grams of water were heated together under a reflux condenser at refluxing or boiling temperature for 1 hour and then the resultant novel liquid resinous reaction product was neutralized with dilute sulphuric acid after which 10 grams of 37½% aqueous formaldehyde solution and ½ gram of lactic acid (80%) were added and the mixture was heated under a reflux condenser at refluxing temperature of 1½ hours. An upper aqueous layer was decanted off leaving the lower layer of fusible resin. A sample of this resin gelled in 30 minutes when heated in an oven at 120° C.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to the novel composition of matter herein claimed without departing from the spirit of the invention. Particularly it is to be understood that in said claims, ingredients or components recited in the singular are intended to include compatible mixtures of said ingredients wherever the sense permits.

Having described our invention, what we claim and desire to protect by Letters Patent is:

1. The method for producing a resinous product whose viscosity is at least 1000 centipoises at 25° C. comprising reacting furfuraldehyde and acetonyl acetone under alkaline conditions and heating the resultant mass until said resin is produced in an amount equal to at least 25% of the organic reaction mass.

2. The method for producing a resinous product whose viscosity is at least 1000 centipoises at 25° C. comprising reacting furfuraldehyde and acetonyl acetone under alkaline conditions, the mole ratio of said furfuraldehyde to said acetonyl acetone being in the range of 1–1 to 8–1, and under said alkaline conditions heating said reaction mass until said resin is produced.

3. A resinous product made according to claim 1.

MORTIMER T. HARVEY.
SOLOMON CAPLAN.

REFERENCES CITED

The following references are of record in the file of this patent:

UNITED STATES PATENTS

| Number | Name | Date |
| --- | --- | --- |
| 2,239,232 | Huyser | Apr. 22, 1941 |
| 2,461,510 | Harvey | Feb. 15, 1949 |

OTHER REFERENCES

Beilstein; Handbuch d. Organische Chemie, vol. 1, 4th ed., page 789.